(12) United States Patent
Minagawa et al.

(10) Patent No.: US 6,342,567 B2
(45) Date of Patent: Jan. 29, 2002

(54) RUBBER COMPOSITION

(75) Inventors: Yasuhisa Minagawa, Akashi; Hiroki Sarashi, Wakayama; Minoru Ueda, Izumi, all of (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/775,634

(22) Filed: Feb. 5, 2001

Related U.S. Application Data

(62) Division of application No. 08/890,798, filed on Jul. 11, 1997, now abandoned.

(30) Foreign Application Priority Data

Jul. 15, 1996 (JP) ............................................. 8-184789

(51) Int. Cl.$^7$ ............................. C08L 21/00; C08L 15/02
(52) U.S. Cl. ........................ 525/192; 525/191; 525/192; 525/123; 525/186; 525/189; 525/194; 525/196; 525/197
(58) Field of Search ................................. 525/107, 123, 525/186, 189, 194, 196, 197

(56) References Cited

U.S. PATENT DOCUMENTS

| | | |
|---|---|---|
| 4,489,187 A | 12/1984 | Middlebrook |
| 5,036,132 A | 7/1991 | Coran |
| 5,063,268 A | 11/1991 | Young |
| 5,491,196 A | 2/1996 | Beers et al. |
| 5,656,694 A | 8/1997 | Frechet et al. |

FOREIGN PATENT DOCUMENTS

| | | |
|---|---|---|
| EP | 0171926 A2 | 2/1986 |
| JP | 57172945 | 10/1982 |

*Primary Examiner*—Jeffrey Mullis
(74) *Attorney, Agent, or Firm*—Birch, Stewart, Kolasch & Birch, LLP

(57) ABSTRACT

A rubber composition obtained by (a) kneading at least one low air permeable rubber having vulcanizable functional group and a curing agent, which can vulcanize the low air permeable rubber having vulcanizable functional group, at a temperature within a range where the low air permeable rubber having vulcanizable functional group is not vulcanized, and (b) blending 25 to 100 parts by weight of at least one rubber having vulcanizable carbon-carbon double bond per 100 parts by weight of the low air permeable rubber having vulcanizable functional group with the kneaded product, kneading at a temperature within a range where the low air permeable rubber having vulcanizable functional group can be vulcanized to selectively vulcanize the low air permeable rubber having vulcanizable functional group. The rubber composition of the present invention is superior in adhesion property by vulcanization to other diene rubber compositions and, from the rubber composition, the rubber molded article not inferior in low air permeability can be obtained.

9 Claims, 1 Drawing Sheet

RUBBER COMPOSITION

This application is a divisional of application Ser. No. 08/890,798, filed on Jul. 11, 1997, now abandoned the entire contents of which are hereby incorporated by reference and for which priority is claimed under 35 U.S.C. §120; and this application claims priority of Application No. 8-184789 filed in Japan on Jul. 15, 1996 under 35 U.S.C. §119.

TECHNICAL FIELD

The present invention relates to a rubber composition containing a low air permeable rubber having a vulcanized functional group (hereinafter referred to also as "functional group-vulcanizable rubber") and a rubber having a vulcanizable carbon-carbon double bond (hereinafter referred to also as "double bond-vulcanizable rubber"). Further in detail, the present invention relates to a rubber composition which is superior in adhesion properties to other diene rubber compositions when subjected to vulcanization and can provide a rubber molded article not inferior in low air permeability.

BACKGROUND OF THE INVENTION

Hitherto, in order to gain performances which cannot be obtained by a rubber composition using only one rubber as a rubber component and also to achieve improvement in processability of the resulting rubber composition and cut costs of raw materials, a blend of two or more rubbers is employed.

Also, in the field of tires, particularly for an innerliner, a case or the like, since low air permeability and adhesion properties with respect to other diene rubber compositions when using vulcanization are necessary, there is employed a rubber composition of two or more rubbers, one of which is a rubber being able to provide low air permeability.

For improving low air permeability, when a proportion of a low air permeable rubber in the rubber composition comprising the low air permeable rubber and other rubbers is increased, for example, to not less than 50% by weight of the rubber component, however, there is a problem in that adhesion properties affected by vulcanization between the obtained rubber composition and other diene rubber compositions becomes considerably lowered.

On the other hand, with respect to a rubber composition comprising two or more rubbers, i.e. a functional group-vulcanizable rubber and a double bond-vulcanizable rubber, JP-A-121766/1996 discloses a rubber composition containing a selectively vulcanized functional group-vulcanizable rubber by carrying out a two-step kneading process. By vulcanizing the obtained rubber composition after molding, the double bond-vulcanizable rubber is also vulcanized and a rubber molded article which does not contain any rubber in a non-vulcanized state can be obtained.

Then, considering the above-mentioned facts, the inventors employ a specified combination of a low air permeable rubber having a vulcanizable functional group and a double bond-vulcanizable rubber at a specified mixing ratio using the above-mentioned two-step kneading method and, thereby, reach a method to obtain a rubber composition which can provide a rubber molded article superior in adhesion properties with respect to other diene rubber compositions by vulcanization and not in low air permeability.

An object of the present invention is to obtain a rubber composition which can provide a rubber molded article superior in adhesion properties with respect to other diene rubber compositions by vulcanization and not inferior with respect to low air permeability.

SUMMARY OF THE INVENTION

Figure 1:
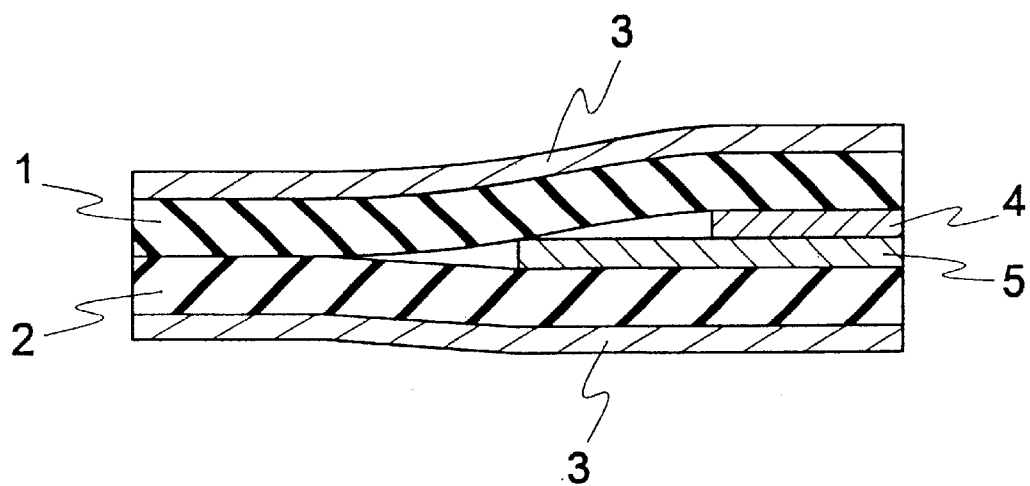
FIG. 1 is a schematic cross-sectional view of a sample for measuring a peel strength.

The present invention relates to a rubber composition obtained by
(a) kneading at least one low air permeable rubber having a vulcanizable functional group and a curing agent which can vulcanize the functional group-vulcanizable rubber at a temperature within a range where the functional group-vulcanizable rubber is not vulcanized, and
(b) blending 25 to 100 parts by weight of at least one rubber having a vulcanizable carbon-carbon double bond per 100 parts by weight of the functional group-vulcanizable rubber with the kneaded product, kneading at a temperature within a range wherein the functional group-vulcanizable rubber can be vulcanized to selectively vulcanize the functional group-vulcanizable rubber.

As the functional group of the functional group-vulcanizable rubber, there can be preferably employed a hydroxyl group, carboxyl group, amino group, isocyanate group, epoxy group, acid anhydride group, halogen atom (including fluorine atom in fluorine-containing polymer), ester group, chlorosulfonic group, methylol group, sulfonic acid salt group and/or nitrile group. As the curing agent, there can be employed an organic curing agent and/or an inorganic curing agent.

As the low air permeable functional group-vulcanizable rubber, there are preferably employed a brominated isobutylene/p-methylstyrene copolymer rubber, chlorobutyl rubber and/or bromobutyl rubber.

Among the curing agents, as the organic curing agent, there is employed polyamine, polycarboxylic acid or polyol and as the inorganic curing agent, there is employed an oxide, carbonate or hydroxide of a bivalent metal such as Mg, Zn, Ca or Ba. The organic curing agent is preferably N,N'-diethylthiourea.

It is preferable that the temperature range for the kneading in the step (a) is from 40° to 100° C. and the temperature range of the kneading in the step (b) is from 90° to 140° C., provided that the kneading temperature in the step (a) must be lower than that in the step (b). It is further preferable that the temperature range for the kneading in the step (a) is from 60° to 90° C. and the temperature range for the kneading in the step (b) is from 100° to 120° C., provided that the kneading temperature in the step (a) must be lower than that in the step (b).

DETAILED DESCRIPTION

The present invention relates to a rubber composition obtained by
(a) kneading at least one low air permeable rubber having vulcanizable functional group and a curing agent which can vulcanize the functional group-vulcanizable rubber at a temperature within a range where the functional group-vulcanizable rubber is not vulcanized, and
(b) blending 25 to 100 parts by weight of at least one rubber having a vulcanizable carbon-carbon double bond per 100 parts by weight of the functional group-vulcanizable rubber with the kneaded product, kneading at a temperature within a range wherein the functional group-vulcanizable rubber can be vulcanized to selectively vulcanize the functional group-vulcanizable rubber.

In the present invention, the functional group-vulcanizable rubber and the double bond-vulcanizable rubber are different from each other with respect to the following points. Namely, the former can endow a rubber molded article obtained from the rubber composition of the present invention with superior low air permeability and the crosslinking point is the functional group. On the other hand, the latter has affinity to other diene rubber compositions and can endow the rubber composition of the present invention with superior adhesion properties with respect to other diene rubbers by vulcanization, and the crosslinking point is the carbon-carbon double bond.

The functional group-vulcanizable rubber may be a rubber having functional group which can provide the crosslinking point. Though the functional group-vulcanizable rubber may contain a carbon-carbon double bond, in such a case, the degree of unsaturation is not higher than 50, preferably not higher than 30. It is further preferable to have a lower degree of unsaturation (higher saturation) of not higher than 25 in order that the functional group can selectively provide a crosslinking point. In other words, the functional group-vulcanizable rubber should not be vulcanizable with sulfur or is vulcanizable with sulfur with difficulty.

In the low air permeable rubber having a vulcanizable functional group, as a rubber to which the functional group is introduced into (hereinafter sometimes referred to as "saturated rubber"), there are employed, for example, acrylonitrile-butadiene rubber (NBR), fluorine-containing rubber, epychlorohydrin rubber, butyl rubber, halogenated butyl rubber, brominated isobutylene/p-methylstyrene copolymer rubber, chloroprene rubber, ethylene/acrylate copolymer rubber and epoxidized natural rubber, ethylene/propylene/diene rubber (EPDM) and the like. Among them, NBR, halogenated butyl rubber, brominated isobutylene/p-methylstyrene copolymer rubber, chloroprene rubber, epoxidized natural rubber, EPDM are preferable from the viewpoint that air permeability thereof is lower than that of the diene rubber such as natural rubber (NR). These rubbers are blended with the double bond-vulcanizable rubber after the necessary functional group is introduced.

The functional group is introduced into the saturated rubber to make vulcanization (crosslinking) possible by a curing agent except for sulfur. In case of fluorine-containing rubber, epichlorohydrin rubber, halogenated butyl rubber, chloroprene rubber, brominated isobutylene/p-methylstyrene copolymer rubber, epoxidized natural rubber and NBR, the functional group is not necessarily introduced newly.

The functional group of the functional group-vulcanizable rubber may be a functional group which make vulcanization (crosslinking) of the functional group-vulcanizable rubber possible by using a curing agent except for sulfur. As the functional group, there are, for example, hydroxyl group, carboxyl group, amino group, isocyanate group, acid anhydride group, halogen atom (including fluorine atom in fluorine-containing polymer), ester group, chlorosulfonic group, methylol group, sulfonic acid salt group and/or nitrile group. Further, in concrete, there are —OH, —COOH, —NH$_2$, —NCO,

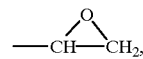

—F, —Cl, —Br, —I, —SO$_2$Cl, —CH$_2$OH, —CH$_2$Cl,

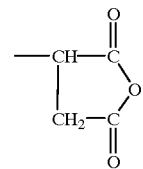

and —C≡N.

Among them, preferable are halogen atom, acid anhydride group, carboxylic group and epoxy group from the viewpoint that these functional groups can react rapidly.

As a method for introducing the functional group into the saturated rubber, usual methods can be employed. When introducing hydroxyl group, for example, there is employed a hydroboration method or so-called oxymercuration-demercuration method which utilizes a slight amount of double bond in the saturated rubber. In case that the saturated rubber contains halogen atom, hydrolysis method is usable. When introducing carboxyl group, there is employed a method in which primary alcohol in oxidized with potassium permanganate or the like, or a carbonatation method using Grignard reagent. When introducing amino group, there is employed, for example, a method in which an alcoholic hydroxyl group is halogenated and then converted to amino group or a method in which a brominated p-methylstyrene is nitrilated and then reduced. When introducing epoxy group, there is employed a method using formic acid and hydrogen peroxide.

The functional group has a role to endow the saturated rubber with a crosslinking point to give the functional group-vulcanizable rubber. An amount of the functional group can be determined optionally according to uses and may be usually 0.5 to 50 of functional groups per 100 units of recurring units, preferably 1 to 10. Even if the amount of the functional group is large, crosslinking density can be controlled by an amount of the curing agent.

Examples of the commercially available low air permeable rubber with vulcanizable functional group are, for instance, EXXPRO 90-10 (brominated isobutylene/p-methylstyrene copolymer rubber) available from EXXON Corporation, Bromobutyl 2222 (bromobutyl rubber) by EXXON Corporation, Chlorobutyl 1066 (chlorobutyl rubber) available from EXXON Corporation, Neoprene WRT (chloroprene rubber) available from Showa Denko K.K. or E.I. du pont de Nemours & Co., epoxidized natural rubber available from Guthrie Co. LTD., Esprene EMA2752 (ethylene/acrylate copolymer rubber) available from Sumitomo Chemical Co. LTD., ROYALTUF® 465 (maleic acid-modified EPDM) available from Uniroyal Chemical Company, Inc. These low air permeable rubbers having vulcanizable functional group can be used in the present invention.

The curing agent in the present invention intermolecularly crosslinks the functional groups of the functional group-vulcanizable rubber and vulcanizes the functional group-vulcanizable rubber. A compound which can selectively react with the functional group is used as the curing agent. In the present invention, an amount of the curing agent is 0.1 to 30 parts by weight to 100 parts by weight of the functional group-vulcanizable rubber, preferably 0.1 to 11 parts by weight. And, as the curing agent, each of the organic curing agent and the inorganic curing agent (except for sulfur) can be used alone, or can be used together.

Examples of the organic curing agent are, for instance, polyamines such as N,N'-diethylthiourea (EUR), N-phenyl-N'-(1,3-dimethylbutyl)-p-phenylenediamine and 4,4'-diamino-diphenyl ether; polycarboxylic acids such as suberic acid, oxalic acid, succinic acid, adipic acid and maleic acid; polyols such as ethylene glycol and propylene glycol; polyisocyanates such as 2,4-tolylenediisocyanate and diphenylmethane-4,4'-diisocyanate; zinc diethyldithiocarbamate and dipentamethylene thiuram tetrasulfide. In case that the functional group of the functional group-vulcanizable rubber is carboxylic group, halogen atom, acid anhydride group or hydroxyl group, it is preferable to use a polyamine as the curing agent. In case of amino group, it is preferable to use a polyol or a polyisocyanate as the curing agent.

Examples of the inorganic curing agent are, for instance, an oxide, carbonate or hydroxide of a divalent metal such as Mg, Zn, Ca, or Ba. In case that the functional group of the functional group-vulcanizable rubber is halogen atom, it is preferable to use the inorganic curing agent. Among them, zinc oxide is further preferable from the viewpoint of high reactivity.

An amount of the organic curing agent to be kneaded with the low air permeable functional group-vulcanizable rubber is 0.1 to 10 parts by weight per 100 parts by weight of the functional group-vulcanizable rubber, preferably 0.1 to 3 parts by weight from the viewpoint of decrease in kneading time and improvements in physical properties of the rubber. Also, an amount of the inorganic curing agent is 1 to 20 parts by weight per 100 parts by weight of the functional group-vulcanizable rubber, preferably 1 to 8 parts by weight from the viewpoint of decrease in kneading time and improvements in physical properties of the rubber. The organic curing agent and the inorganic agent can be used alone or can be used together. When the organic curing agent and the inorganic agent are used together, each can be used in an amount within the range where each curing agent is used alone.

At this step, other additives may be admixed in an amount within a range where the adhension property by vulcanization of the rubber composition of the present invention and the low air permeability of the rubber molded article obtained from the rubber composition are not lowered. Examples of the other ingredients are, for instance, accelerators such as stearic acid, process oils, fillers such as carbon black, antioxidants, and the like.

As a method of the kneading in the step (a), it is preferable to carry out the kneading at a temperature within a range where the functional group-vulcanizable rubber is not vulcanized and processability of the rubber composition is not decreased. Preferably the kneading step (a) is carried out at a temparature within a range from 60° to 100° C. from the viewpoint of improvement of processability, further preferably within a range from 40° to 90° C. from the viewpoint of improvement of physical properties. Also, it is preferable to carry out the kneading step (a) by means of open rolls from the viewpoint that physical properties are made stable, or by means of a banbury mixer from the viewpoint that processability and workability are increased.

Then, in the step (b), the kneaded product obtained in the step (a) is kneaded with the double bond-vulcanizable rubber at a temperature within a range where the functional group-vulcanizable rubber can be vulcanized to selectively vulcanize the functional group-vulcanizable rubber.

The double bond-vulcanizable rubber may be a rubber having carbon-carbon double bond which gives crosslinking point. Though any functional group may be contained, it is preferable that the content of the functional group is lower, preferably 0.1 to 5 of functional groups per 100 units of recurring units. On the other hand, it is preferable that the content of the carbon-carbon double bond is higher. The degree of unsaturation of the double bond-vulcanizable rubber is not lower than 50, preferably not lower than 70, and not lower than 90 in case where the functional group is contained.

The double bond-vulcanizable rubber may be a rubber which has affinity to diene rubber compositions and endows the rubber composiotion to be obtained with superior adhension property to other diene rubber compositions by vulcanization. Examples of the double bond-vulcanizable rubber are, for instance, diene rubbers such as NR, isoprene rubber, butadiene rubber, styrene-butadiene rubber (SBR) and NBR. The rubber can be used alone, or in optional admixture of two or more. It is preferable to use NR, SBR, NBR from the viewpoint that mechanical strength is improved and it is further preferable to use NR from the viewpoint that tackiness is given.

With respect to an amount of the double bond-vulcanizable rubber to be kneaded with the kneaded product obtained in the step (a), an amount of the double bond-vulcanizable rubber is 25 to 100 parts by weight per 100 parts by weight of the functional group-vulcanizable rubber, from the viewpoint that air permeability is lowered more preferably 25 to 50 parts by weight, and from the viewpoint that adhesive strength is increased, preferably 50 to 100 parts by weight. A rubber composition obtained by kneading and selectively vulcanizing the functional group-vulcanizable rubber is the rubber composition of the present invention. At the kneading step (b) for the selective vulcanization, other additives may be admixed in an amount within a range where the adhesion property by vulcanization of the rubber composition of the present invention and the low air permeability of the rubber molded article obtained from the rubber composition is not lowered. Examples of the other additives are, for instance, accelerators such as stearic acid, process oils, fillers, antioxidants and the like.

In the kneading step (b), only the functional group-vulcanizable rubber is vulcanized selectively in the blended rubber comprising the functional group-vulcanizable rubber and the double bond-vulcanizable rubber.

The selective vulcanization is achieved by kneading at a temperature within a range where the functional group-vulcanizable rubber begins to be vulcanized and deterioration of the resulting rubber composition is not caused. When using naterial rubber, the kneading temperature in the step (b) is preferably from 90° to 140° C., further preferably from 100° to 120° C. from the viewpoint that a kneaing time can be shorten. Kneading can be carried out in the same means and procedures as in the kneading of the step (a). The temperature at the time of the selective vulcanization in the step (b) must be higher than the kneading temperature in the step (a). And, it is preferable to carry out the kneading in a banbury mixer from the viewpoint of improvements of processability and workability.

The obtained rubber composition comprises the non-vulcanized double bond-vulcanizable rubber as the matrix in which the vulcanized functional group-vulcanizable rubber exists uniformly.

The rubber composition of the present invention is superior in adhension property to other diene rubber compositions by vulcanization. After the rubber composition of the present invention is molded according to a usual molding method such as molding with rolls or extrution molding, the double bond-vulcanizable rubber is finally vulcanized to give a rubber molded article superior in low air permeability.

The vulcanization of the double bond-vulcanizable rubber can be carried out by adding a given amount (for example, 0.5 to 2 PHR) of sulfur which is a vulcanizing agent for the double bond-vulcanizable rubber into the rubber composition and, if necessary, adding an accelerator such as stearic acid, N-tert-butyl-2-benzothiazolylsulfenamide (NS), a process oil, a filler such as carbon black and an antioxidant optionally, keading, molding and then heating.

The rubber composition of the present invention is applicable to many kinds and manners of uses. The rubber composition of the present invention can be used particularly for an innerliner and a case of tire, a tube, a gas hose and the like.

In the present invention, for example, the following compositions for the rubber composition and conditions for the kneading can be adopted.

| (Embodiment 1) | |
|---|---|
| Functional group-vulcanizable rubber (EXXPRO 90-10) | 100 parts by weight |
| Organic curing agent (EUR) | 0.1 to 1 parts by weight |
| Inorganic curing agent (ZnO) | 1 to 5 parts by weight |
| Double bond-vulcanizable rubber (NR) | 25 to 100 parts by weight |
| Kneading temperature in (a) | 45° to 85° C. |
| Kneading time in (a) | 3 to 6 min. |
| Selective vulcanization temperature in (b) | 100° to 120° C. |
| Selective vulcanization time in (b) | 4 to 10 min. |

This rubber composition is advantageous from the viewpoint that the rubber molded article having good properties such as low air permeability and adhension property by vulcanization

| (Embodiment 2) | |
|---|---|
| Functional group-vulcanizable rubber (epoxidized NR) | 100 parts by weight |
| Organic curing agent (EUR) | 0.1 to 3 parts by weight |
| Inorganic curing agent (ZnO) | 1 to 3 parts by weight |
| Double bond-vulcanizable rubber (NR) | 25 to 100 parts by weight |
| Kneading temperature in (a) | 45° to 75° C. |
| Kneading time in (a) | 3 to 6 min. |
| Selective vulcanization temperature in (b) | 100° to 120° C. |
| Selective vulcanization time in (b) | 4 to 10 min. |

This rubber composition is advantageous from the viewpoint that the rubber molded article having good properties such as high hardness as well as low air permeability and adhension property by vulcanization.

| (Embodiment 3) | |
|---|---|
| Functional group-vulcanizable rubber (halogenated butyl rubber) | 100 parts by weight |
| Organic curing agent (EUR) | 0.1 to 2 parts by weight |
| Inorganic curing agent (ZnO) | 1 to 5 parts by weight |
| Double bond-vulcanizable rubber (NR) | 25 to 100 parts by weight |
| Kneading temperature in (a) | 48° to 85° C. |
| Kneading time in (a) | 3 to 10 min. |
| Selective vulcanization | 100° to 120° C. |

| -continued | |
|---|---|
| (Embodiment 3) | |
| temperature in (b) | |
| Selective vulcanization time in (b) | 4 to 10 min. |

This rubber composition is advantageous from the viewpoint that air permeability is low.

| (Embodiment 4) | |
|---|---|
| Functional group-vulcanizable rubber (maleic acid-modified EPDM) | 100 parts by weight |
| Organic curing agent (EUR) (4,4'-diamino-diphenyl ether) | 0.5 to 3 parts by weight |
| Inorganic curing agent (ZnO) | 1 to 5 parts by weight |
| Double bond-vulcanizable rubber (NR) | 25 to 100 parts by weight |
| Kneading temperature in (a) | 45° to 80° C. |
| Kneading time in (a) | 2 to 4 min. |
| Selective vulcanization temperature in (b) | 100° to 120° C. |
| Selective vulcanization time in (b) | 2 to 8 min. |

This rubber composition is advantageous from the viewpoint that weather resistance as well as low air permeability are obtained.

| (Embodiment 5) | |
|---|---|
| Functional group-vulcanizable rubber (carboxylic group-containing NBR) | 100 parts by weight |
| Organic curing agent (EUR) | 0.5 to 3 parts by weight |
| Inorganic curing agent (ZnO) | 1 to 5 parts by weight |
| Double bond-vulcanizable rubber (NR) | 25 to 100 parts by weight |
| Kneading temperature in (a) | 40° to 80° C. |
| Kneading time in (a) | 2 to 4 min. |
| Selective vulcanization temperature in (b) | 100° to 120° C. |
| Selective vulcanization time in (b) | 2 to 8 min. |

This rubber composition is advantageous from the viewpoint that air permeability is low.

The preparation of the rubber composition of the present invention is explained in detail according to Examples in the followings. The present invention, however, is not limited thereto.

PREPARATION EXAMPLES 1 to 7

In first, Kneaded Products A to G through the step (a) of the present invention were prepared by kneading with rolls in the mixing ratios and conditions shown in Table 1.

As the functional group-vulcanizable rubber 1, EXXPRO 90-10 (bromide of isobutylene/p-methylstyrene copolymer rubber) available from EXXON Corporstion was used. As the functional group-vulcanizable rubber 2, Bromobutyl 2222 (bromobutyl rubber) available from EXXON Corporation was used. As the functional group-vulcanizable rubber 3, Chlorobutyl 1066 (chorobutyl rubber) available from EXXON Corporation was used. As the functional group-vulcanizable rubber 4, ROYALTUF® 465 (maleic acid-modified EPDM) available from Uniroyal Chemical Company, Inc. was used. As the functional group-vulcanizable rubber 5, DN 631 (carboxyl group-containing NBR) available from Nippon Zeon Co., Ltd. was used. As the functional group-vulcanizable rubber 6, ENR 50 (epoxdized natural rubber) available from Guthrie Co. LTD. was used. As the functional group-vulcanizable rubber 7, Neoprene WRT (chloroprene) available from SHOWA DENKO K.K was used.

Also, as the curing agent 1, EUR (N,N'-diethylthiourea) available from Ouchi Sinko Kagaku Kogyo Kabushiki Kaisha was used. As the curing agent 2, 4,4'-diamino-diphenyl ether was used. And, as the curing agent 3, ZnO was used.

COMPARATIVE PREPARATION EXAMPLE 1

The vulcanized Kneaded Product H was obtained in the same manner as in Preparation Example 1 (Kneaded Product A) except that the kneading was carried out at 100° C. which was the vulcanizing temperature of the functional group-vulcanizable rubber.

tion time to obtain Rubber Molded Articles 1 to 16 in the form of rubber sheets of 1 mm in thickness.

According to the testing method of ASTM D-1434-75M, an air permeability of each Rubber Molded Article 1 to 16 was measured at a temperature of 20° C. by means of Gas Permeability Measuring Machine (GTR TESTER M-C1) available from TOYO SEIKI SEISAKU-SHO, LTD. The results are shown in Table 2.

Adhesion property by vulcanization:

To evaluate adhesion property to diene rubber compositions by vulcanization of the rubber composition of the present invention, sheets of 2 mm in thickness were prepared from Rubber Compositions 1 to 16 by means of rolls and then Rubber Sheets 1 to 16 of 2 mm in thickness, 80 mm in width and 150 mm in length were produced. Separately, a sheet of 2 mm in thickness was prepared from a blend (including carbon black, sulfur and vulcanizing accelerator) of natural rubber and butadiene rubber in a weight ratio of

TABLE 1

| | Kneaded Product A | Kneaded Product B | Kneaded Product C | Kneaded Product D | Kneaded Product E | Kneaded Product F | Kneaded Product G | Kneaded Product H |
|---|---|---|---|---|---|---|---|---|
| Low air permeable functional group-vulcanizable rubber (parts by weight) | | | | | | | | |
| 1 | 100 | — | — | — | — | — | — | 100 |
| 2 | — | 100 | — | — | — | — | — | — |
| 3 | — | — | 100 | — | — | — | — | — |
| 4 | — | — | — | 100 | — | — | — | — |
| 5 | — | — | — | — | 100 | — | — | — |
| 6 | — | — | — | — | — | 100 | — | — |
| 7 | — | — | — | — | — | — | 100 | — |
| Curing agent (parts by weight) | | | | | | | | |
| 1 | 0.25 | 0.25 | 0.5 | — | — | — | — | 0.25 |
| 2 | — | — | — | 1 | 1 | 0.5 | — | — |
| 3 | 1.5 | 1.5 | 1.5 | 1.5 | 1.5 | 1.5 | 1.5 | 1.5 |
| Stearic acid (parts by weight) | 1 | 1 | 1 | 1 | 1 | 1 | 1 | 1 |
| Kneading condition | | | | | | | | |
| Means | rolls | rolls | rolls | rolls | rolls | rolls | rolls | rolls |
| Temperature (° C.) | 50 | 50 | 50 | 50 | 50 | 50 | 50 | 100 |
| Time (min.) | 5 | 5 | 5 | 5 | 5 | 5 | 5 | 5 |

EXAMPLES 1 to 16

Rubber Compositions 1 to 16 of the present invention were prepared by kneading and selectively vulcanizing Kneaded Products A to G obtained in Preparation Examples 1 to 7 according to the step (b) at 100° C. for 8 minutes by means of a banbury mixer in the mixing ratios shown in Table 2. The double-bond vulcanizable rubber was natural rubber. As the carbon black, DIABLACK H available from Mitsubishi Chemical Corporation was used. As the mineral oil, a mineral oil available from JAPAN ENERGY CORPORATION was used.

Evaluation method
Air permeability:

To evaluate air permeability of rubber molded articles comprising the rubber compositions of the present invention, 5 parts by weight of ZnO, 1 part by weight of stearic acid, 2 parts by weight of sulfur, 1 part by weight of NS and 100 parts by weight of each Rubber Composition 1 to 16 were kneaded by means of rolls. To vulcanize the double bond-vulcanizable rubber, the vulcanization and the molding were carried out by means of an oil press under the conditions of 100 kg/cm² of vulcanization pressure, 150° C. of vulcanization temperature and 40 minutes of vulcaniza- 40:60, a diene rubber sheet of 80 mm in width and 150 mm in length was produced by cutting the sheet. After each of the obtained rubber sheets 1 to 16 was adhered by vulcanization to the diene rubber sheet, peel strength (adhesive strength) was measured. The higher the peel strength is, the superior the adhesion property by vulcanization is.

To produce a sample for measuring a peel strength, as shown in FIG. 1, the rubber sheet 1 was put on the diene sheet 2 by inserting partly the inserting members comprising Mylar film 4 and nylon canvas 5 therebetween so that peeling is began at their interfaces. Then the rubber sheet 1 and the diene sheet 2 were adhered by vulcanization to each other at 160° C. for 30 minutes with a pressure of 100 kgf/cm². Numeral 3 designates a topped fabric which is reinforcing the rubber sheets not to be torn at the time of peeling procedure and, usually, is not valcanized. In the present invention, the rubber coated polyester resin of 1 mm in thickness, 80 mm in width and 150 mm in length was employed as the topped fabric 3. Mylar film 4 prevents the rubber sheets from adhering to each other on their whole surfaces, and can have a melting point of not lower than 180° C. In the present invention, the Mylar film comprising polyethylene terephthalate of 0.05 mm in thickness, 80 mm in width and 40 mm in length was employed. The nylon canvas 5 was inserted to begin the peeling at the adhered interface. In the present invention, an nylon canvas of a nylon resin of 0.5 mm in thickness, 80 mm in width and 80 mm in length was employed.

A peel strength was measured by peeling the sample for measuring a peel strength which was prepared as above at a peeling rate of 50 mm/min by means of Tensile Testing Machine available from Intesco Corporation. The results are shown in Table 2.

evaluations were carried out in the same manner as in Example 1. The results are shown in Table 3.

COMPARATIVE EXAMPLE 20

The kneading was tried in the same manner as in Comparative Example 1 except that Kneaded Product H (kneading temperature: 100° C.) obtained in Comparative

TABLE 2

| | Rubber Composition | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| Kneaded Product (parts by weight) | | | | | | | | | | | | | | | | |
| A | 62 | 72 | 51 | 82 | — | — | — | — | — | — | — | — | — | — | — | — |
| B | — | — | — | — | 62 | 72 | 51 | 82 | — | — | — | — | — | — | — | — |
| C | — | — | — | — | — | — | — | — | 62 | 72 | 51 | 82 | — | — | — | — |
| D | — | — | — | — | — | — | — | — | — | — | — | — | 51 | — | — | — |
| E | — | — | — | — | — | — | — | — | — | — | — | — | — | 51 | — | — |
| F | — | — | — | — | — | — | — | — | — | — | — | — | — | — | 53 | — |
| G | — | — | — | — | — | — | — | — | — | — | — | — | — | — | — | 54 |
| Natural rubber (parts by weight) | 40 | 30 | 50 | 20 | 40 | 30 | 50 | 20 | 40 | 30 | 50 | 20 | 50 | 50 | 50 | 50 |
| Carbon black (parts by weight) | 45 | 45 | 45 | 45 | 45 | 45 | 45 | 45 | 45 | 45 | 45 | 45 | 45 | 45 | 45 | 45 |
| Mineral oil (parts by weight) | 9 | 9 | 9 | 9 | 9 | 9 | 9 | 9 | 9 | 9 | 9 | 9 | 9 | 9 | 9 | 9 |
| Air permeability ($cm^3 \cdot cm^2 \cdot sec \cdot cmHg$) | 10.7 | 9.28 | 20.4 | 8.54 | 10.5 | 9.3 | 20.1 | 8.46 | 10.8 | 10.1 | 21.4 | 9.3 | 33 | 15.3 | 15.6 | 26.3 |
| Adhesion property by vulcanization (kgf/25 mm) | 32.1 | 23 | 51 | 20.6 | 27.8 | 20.4 | 46 | 18.9 | 28 | 20.4 | 45 | 19.3 | 65.4 | 72.3 | 74.6 | 63.2 |

COMPARATIVE EXAMPLES 1 to 19

Comparative Rubber Compositions 1 to 19 were obtained by kneading in the mixing ratios shown in Table 3 at 100° C. for 8 minutes by means of a banbury mixer. Then, Preparation Example 1 was used and the mixing ratio shown in Table 3 was employed. However, the vulcanized Kneaded Product H could not disperse into the rubber component uniformly and no rubber composition could be obtained.

TABLE 3

| | Comparative Rubber Composition | | | | | | | | | |
|---|---|---|---|---|---|---|---|---|---|---|
| | 1 | 2 | 3 | 4 | 5 | 6 | 7 | 8 | 9 | 10 |
| Low air permeable functional group-vulcanizable rubber (parts by weight) | | | | | | | | | | |
| 1 | 40 | 60 | 70 | 50 | 80 | — | — | — | — | — |
| 2 | — | — | — | — | — | 40 | 60 | 70 | 50 | 80 |
| 3 | — | — | — | — | — | — | — | — | — | — |
| 4 | — | — | — | — | — | — | — | — | — | — |
| 5 | — | — | — | — | — | — | — | — | — | — |
| 6 | — | — | — | — | — | — | — | — | — | — |
| 7 | — | — | — | — | — | — | — | — | — | — |
| Kneaded Product H (parts by weight) | — | — | — | — | — | — | — | — | — | — |
| Natural rubber (parts by weight) | 60 | 40 | 30 | 50 | 20 | 60 | 40 | 30 | 50 | 20 |
| Carbon black (parts by weight) | 45 | 45 | 45 | 45 | 45 | 45 | 45 | 45 | 45 | 45 |
| Mineral oil (parts by weight) | 9 | 9 | 9 | 9 | 9 | 9 | 9 | 9 | 9 | 9 |
| Air permeability ($cm^3 \cdot cm^2 \cdot sec \cdot cmHg$) | 25.8 | 13.8 | 11.1 | 20.1 | 8.62 | 25.4 | 13.2 | 10.8 | 20.1 | 8.45 |
| Adhesion property by vulcanization (kgf/25 mm) | 25.8 | 12 | 6.2 | 14.8 | 3.8 | 18.3 | 10 | 4.8 | 10.3 | 2.4 |

TABLE 3-continued

| | Comparative Rubber Composition | | | | | | | | | |
|---|---|---|---|---|---|---|---|---|---|---|
| | 11 | 12 | 13 | 14 | 15 | 16 | 17 | 18 | 19 | 20 |
| Low air permeable functional group-vulcanizable rubber (parts by weight) | | | | | | | | | | |
| 1 | — | — | — | — | — | — | — | — | — | — |
| 2 | — | — | — | — | — | — | — | — | — | — |
| 3 | — | — | — | — | — | — | — | — | — | — |
| 4 | 40 | 60 | 70 | 50 | 80 | — | — | — | — | — |
| 5 | — | — | — | — | — | 50 | — | — | — | — |
| 6 | — | — | — | — | — | — | 50 | — | — | — |
| 7 | — | — | — | — | — | — | — | 50 | — | — |
| Kneaded Product H (parts by weight) | — | — | — | — | — | — | — | — | 50 | 50.5 |
| Natural rubber (parts by weight) | 60 | 40 | 30 | 50 | 20 | 50 | 50 | 50 | 50 | 50 |
| Carbon black (parts by weight) | 45 | 45 | 45 | 45 | 45 | 45 | 45 | 45 | 45 | 45 |
| Mineral oil (parts by weight) | 9 | 9 | 9 | 9 | 9 | 9 | 9 | 9 | 9 | 9 |
| Air permeability ($cm^3 \cdot cm^2 \cdot sec \cdot cmHg$) | 26.4 | 13.5 | 11.2 | 20.9 | 9.32 | 33.5 | 15.9 | 16.5 | 27 | — |
| Adhesion property by vulcanization (kgf/25 mm) | 18.2 | 10.2 | 4.8 | 10.5 | 3.4 | 20.4 | 30.6 | 33.6 | 19.4 | — |

From Tables 2 and 3, it is recognized that the rubber composition of the present invention is superior in adhesion property to other diene rubber compositions by vulcanization and that Rubber Molded Articles 1 to 16 obtained from Rubber Compositions 1 to 16 are not inferior in low air permeability compared to the Comparative Rubber Molded Articles 1 to 19 obtained from Comparative Rubber Compositions 1 to 19.

The rubber composition of the present invention is superior in adhesion property to other diene rubber compositions by vulcanization and, from the rubber composition, the rubber molded article not inferior in low air permeability can be obtained.

What is claimed is:

1. A process for producing a rubber composition which comprises:
   (a) kneading at least one low air permeable rubber having a vulcanizable functional group and a curing agent, which can vulcanize the low air permeable rubber having the vulcanizable functional group, at a temperature within a range where the low air permeable rubber having the vulcanizable functional group is not vulcanized, and
   (b) blending 25 to 100 parts by weight of at least one rubber having a vulcanizable carbon-carbon double bond per 100 parts by weight of the low air permeable rubber having the vulcanizable functional group with the kneaded product, kneading at a temperature within a range where the low air permeable rubber having the vulcanizable functional group can be vulcanized to selectively vulcanize the low air permeable rubber having the vulcanizable functional group, wherein the temperature range for kneading in step (a) is from 40° to 100° C., the temperature range for kneading in step (b) is from 90° to 140° C., and the kneading temperature of step (a) is lower than that of step (b).

2. The the process of claim 1, wherein the functional group of the low air permeable rubber having a vulcanizable functional group is an hydroxyl group, carboxyl group, amino group, isocyanate group, epoxy group, halogen atom, fluorine atom in a fluorine-containing polymer, acid anhydride group, ester group, chlorosulfonic group, methylol group, sulfonic acid salt group and/or nitrile group.

3. The process of claim 1, wherein the low air permeable rubber having a vulcanizable functional group is brominated isobutylene/p-methylstyrene copolymer rubber.

4. The process of claim 1, wherein the low air permeable rubber having a vulcanizable functional group is chlorobutyl rubber and/or bromobutyl rubber.

5. The process of claim 1, wherein the curing agent is an oxide, carbonate or hydroxide of a bivalent metal of Mg, Zn, Ca or Ba.

6. The process of claim 1, wherein the curing agent is N,N'-diethylthiourea.

7. The process of claim 1, wherein an organic curing agent and an inorganic curing agent are used as the curing agent.

8. A process for producing a rubber composition which comprises:
   (a) kneading at least one low air permeable rubber having a vulcanizable functional group and a curing agent, which can vulcanize the low air permeable rubber having the vulcanizable functional group, at a temperature within a range where the low air permeable rubber having the vulcanizable functional group is not vulcanized, and
   (b) blending 25 to 100 parts by weight of at least one rubber having a vulcanizable carbon-carbon double bond per 100 parts by weight of the low air permeable rubber having the vulcanizable functional group with the kneaded product, kneading at a temperature within a range where the low air permeable rubber having the vulcanizable functional group can be vulcanized to selectively vulcanize the low air permeable rubber having the vulcanizable functional group, wherein the rubber having a vulcanizable carbon-carbon double bond has not been vulcanized and,
   wherein the temperature range for kneading in step (a) is from 40° to 100° C., the temperature range for kneading in step (b) is from 90° to 140° C., and the kneading temperature of step (a) is lower than that of step (b).

9. A process for producing a rubber composition which consists essentially of:

(a) kneading at least one low air permeable rubber having a vulcanizable functional group and a curing agent, which can vulcanize the low air permeable rubber having the vulcanizable functional group, at a temperature within a range where the low air permeable rubber having the vulcanizable functional group is not vulcanized, and (b) blending 25 to 100 parts by weight of at least one rubber having a vulcanizable carbon-carbon double bond per 100 parts by weight of the low air permeable rubber having the vulcanizable functional group with the kneaded product, kneading at a temperature within a range where the low air permeable rubber having the vulcanizable functional group can be vulcanized to selectively vulcanize the low air permeable rubber having the vulcanizable functional group, wherein the rubber having a vulcanizable carbon-carbon double bond has not been vulcanized and, wherein the temperature range for kneading in step (a) is from 40° to 100° C., the temperature range for kneading in step (b) is from 90° to 140° C., and the kneading temperature of step (a) is lower than that of step (b).

* * * * *